(No Model.)
R. ARNOLD.
FILTER.
No. 386,421. Patented July 17, 1888.
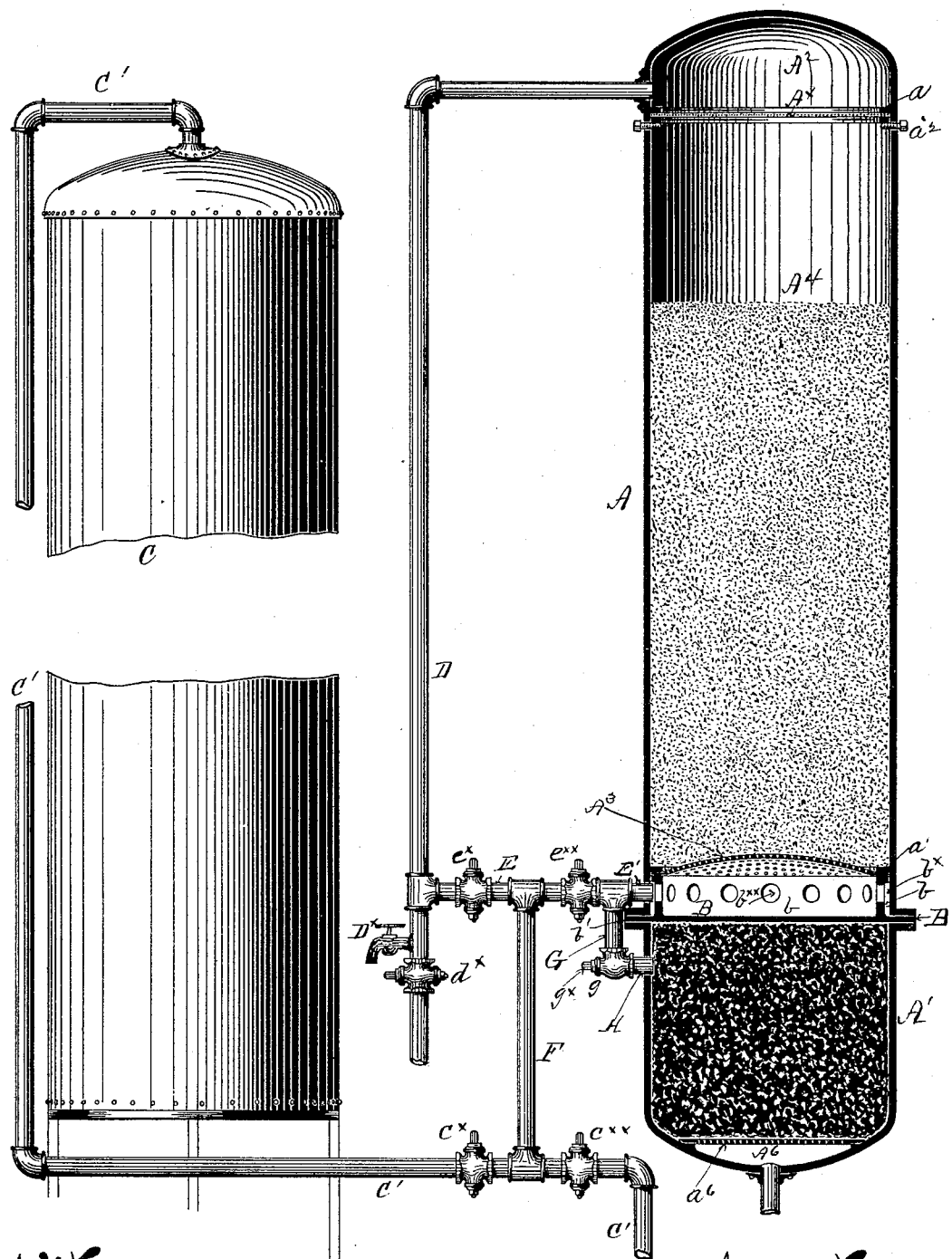
Witnesses:
W. H. Smyth
Geo. H. Weffinger
Inventor.
Rawdon Arnold

UNITED STATES PATENT OFFICE.

RAWDON ARNOLD, OF OAKLAND, CALIFORNIA.

FILTER.

SPECIFICATION forming part of Letters Patent No. 386,421, dated July 17, 1888.

Application filed September 13, 1887. Serial No. 249,555. (No model.)

*To all whom it may concern:*

Be it known that I, RAWDON ARNOLD, a citizen of the United States, residing at Oakland, in the county of Alameda and State of California, have invented certain new and useful Improvements in Filters; and I do declare the following to be a full, clear, and exact description of the invention, such as will enable others skilled in the art to which it appertains to make and use the same, reference being had to the accompanying drawing, and to the letters and figures of reference marked thereon, which form a part of specification.

My invention relates to filters, and has for its object the provision of a filter so constructed and located that it can be relied upon to filter the water for a whole house, and which can be washed out or thoroughly cleaned by hot water from the boiler of the hot-water supply of the house or other building. It also contemplates the provision of entirely separated filtering and auxiliary or charcoal chambers, in the former of which the water is freed from all visible impurities and is carried in a comparatively pure condition to the latter chamber, where the further filtration of the water is carried on, and where it is to a great measure freed of the invisible but poisonous and fatal impurities with which much of the water furnished to cities and towns is loaded. In achieving these objects I have devised a novel and efficient construction of filter and connect it to the hot-water boiler in a unique manner, so that it shall in the most perfect way fulfill the purposes of its production and use. This novel construction and use will appear in the following detailed description of parts.

The accompanying drawing illustrates what I consider the best means for carrying my invention into practice.

The figure represents an elevation of the hot-water boiler used in kitchens, the connections therefrom and from the cold-water main to, and a vectical section of my improved filtering device.

From the location of this device and its connections it will be seen that all the cold water which is supplied to the house or building is submitted to the very searching filtration which my device gives, and also that the hot water can be utilized to wash or flush out the filter, and, when desired, that the water supplied to the boiler may also be filtered.

I will first describe the construction of the filtering device proper, and will then describe the connections whereby the filtration through and cleaning of it is accomplished.

The body of the filter is composed of two parts, A and A', the former of which constitutes the barrel of the filter and the latter an auxiliary or charcoal chamber. These portions are entirely separated from each other by a head, B, whose construction and function will presently be explained. The barrel or part A is cast with two continuous all-round internal flanges or ribs, $a$ $a'$, the former near the top and the latter near the lower end. Under the flange $a$ is held by bolts $a^2$ a sieve or strainer, $A^\times$, which separates a space, $A^2$, from the main portion of the barrel A. The water to be filtered enters the filter through this space $A^2$, and the coarser particles carried by it are arrested by the sieve or strainer $A^\times$. Under the flange $a'$ is held a screen or disk, $A^3$, which is dish-shaped, (or concavo-convex,) with its concave side turned downward. This screen or disk is held in place by a portion of the head B, which rests against its under side and holds it firmly against the flange $a'$. The space $A^4$, above this screen $A^3$, is partially filled with sand or other suitable filtering material, as shown at $A^5$.

The head B has an upwardly-projecting lip or flange, $b$, which is the part which holds the screen $A^3$ in place, as above described. This flange $b$ is smaller in diameter than the filter-barrel, so that a space, $b^\times$, is afforded all round between the flange or rim and the interior circumference of barrel, and a series of openings, $b^{\times\times}$, is provided through the flange or rim, which permits the passage of water. The head is extended beyond the flange $b$ into a horizontal flange, $b'$, which is finished on both sides and is held between the flanges on the parts A and A', which are bolted together in the ordinary manner, with the rim or flange $b'$ and suitable packing, if found necessary, between them. The horizontal portion of the head is imperforate, thus completely separating the spaces in parts A and A' and rendering the only connection possible through the medium of a pipe or pipes extending from one to the other outside of the filter.

The chamber A' is provided with a screen or sieve, $a^6$, which separates the chamber proper, A', from a small water-space, $A^6$, from which the discharge-pipe leads off to supply the different faucets of the house.

The chamber A' is filled from head B to sieve $a^6$ with bone-coal or other chemical used in purifying water.

C is the hot-water boiler, and C' the pipe therefrom through which the hot water is carried when the filter is to be cleaned.

D is the water-supply pipe from the main to the filter, entering the filter, as shown, in the space above the sieve or strainer $A^\times$. It is connected by a T-coupling to a transverse pipe, E, which enters the space $b^\times$ around the upright flange or sleeve $b$ of head B.

Pipe D is provided with a plug valve or cock, $d^\times$, below the connection or T-coupling.

Pipe C' from the boiler is connected to transverse pipe E by a short pipe, F, which is united with pipes C' and E by T-couplings, as shown. Cocks $c^\times$ $c^{\times\times}$ are provided in pipe C' on each side of its connection with pipe F, and cocks $e^\times$ and $e^{\times\times}$ are provided in pipe E at corresponding points. Between cock $e^{\times\times}$ and the filter a short pipe, G, is T-coupled into pipe E, leaving the nipple or short extension thereof (shown at E') extending into the space $b^\times$, as above described. The short pipe G is connected at the bottom by an elbow-coupling, $g$, to a nipple, H, which extends into the chamber A'. In the elbow-coupling (or, if preferred, in the pipe G or nipple H) is provided a cock, $g^\times$, by means of which the flow through these pipes may be stopped.

In the ordinary operation of filtering the water from or delivered by pipe D the cocks must be in the following condition, respectively: cock $d^\times$ open, cocks $e^\times$ and $e^{\times\times}$ closed, cock $g^\times$ open, and cocks $c^\times$ and $c^{\times\times}$ closed or open, as may be desired. As thus conditioned the water flows into the top of the filter-barrel through pipe D, passes sieve $A^\times$, and percolates through sand or other filtering matter, $A^4$, through perforate disk A, out through openings $b^{\times\times}$ and space $b^\times$, through nipple E', through pipes G and H into chamber A', through chamber A' and screen or sieve $a^6$ into space $A^6$, and out through discharge-pipe $A^7$, becoming thereby freed of both the solid visible impurities and the poisonous matter which cannot be seen. As will be noticed, the space afforded by the concavo-convex disk A gives a receptacle which will be kept partially or quite filled with water, so as to keep the connection between the filter-barrel and chamber A' sealed. To wash out the filter from the boiler, the cocks must be conditioned as follows: cock $c^\times$ open, cock $c^{\times\times}$ closed, cock $e^\times$ closed, cock $e^{\times\times}$ open, cock $g^\times$ closed, cock $d^\times$ open. The hot water under the usual pressure will flow through pipe C', pipe F, pipes E and E' into the filter-barrel, up through the filtering material contained therein, which it will thoroughly wash, cleanse, and loosen and settle into proper position, and thence through sieve $A^\times$ and out through pipe D, carrying all impure matter out with it. A discharge-faucet, $D^\times$, may be provided in pipe D for this purpose, and when such is provided above the cock $d^\times$, as shown in the drawing, the said cock should be closed in the operation above described.

To filter the water from the boiler, (the boiler may or may not be primarily supplied with the filtered water; when it is not, the method about to be described may be pursued,) condition the cocks as follows: cock $c^\times$ open, cock $c^{\times\times}$ closed, cock $e^{\times\times}$ closed, cock $e^\times$ open, cock $d^\times$ closed, cock $g^\times$ open. Then the hot water will flow through pipe C', pipe F, one side of pipe E to pipe D, through D to the top of filter and be filtered in the same manner as the cold water.

Having thus described my invention, what I claim is—

1. The combination, with a filter having a barrel and an auxiliary chamber, and provided with the imperforate head B and screen $A^3$, separating said parts, said head being provided with an upwardly-extending perforate collar of smaller diameter than the barrel, of pipe-connections between the space outside the collar and the auxiliary chamber, and pipes connecting to a cold and a hot water supply.

2. The combination of a filter having the barrel A, screens $A^\times$ and $A^3$, and an auxiliary chamber, A', and an imperforate head between them, and a supply-pipe with the space between the head B and disk $A^3$, with the auxiliary chamber, and a warm-water pipe connected to the pipe E between the supply-pipe D and the filter, as set forth.

3. A filter having a screen or perforate disk near one end, an imperforate head secured upon the end of the filter, a collar of smaller size than the barrel of the filter extending up against said disk, a series of openings in said collar, a space around said collar, and a discharge-passage connected with said space.

4. A filter consisting of the two chambers A and A', having flanged meeting ends, a solid head between them, a perforate plate or screen held in chamber A' to produce or form a space above said head beneath the filtering material, and a space beneath the filtering or purifying material in said chamber A', as set forth.

In testimony whereof I affix my signature in presence of two witnesses.

RAWDON ARNOLD.

Witnesses:
W. F. RUDOLPH,
WM. F. BILGER.